Nov. 27, 1956 T. E. SCHRAMLING 2,771,732
HAY TEDDER
Filed Jan. 15, 1954 2 Sheets-Sheet 1

THOMAS E. SCHRAMLING INVENTOR

BY *CA Snow &co.*

ATTORNEYS.

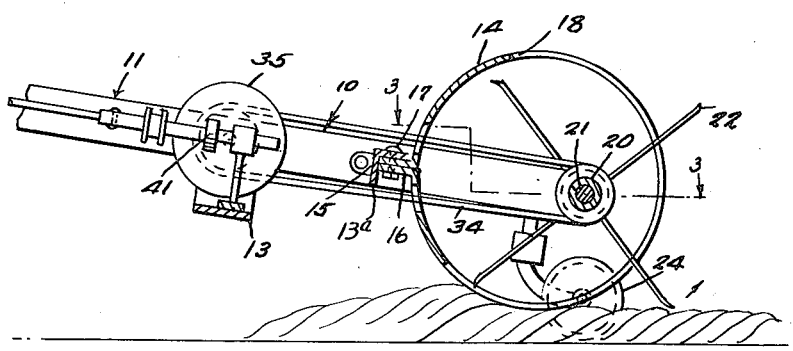
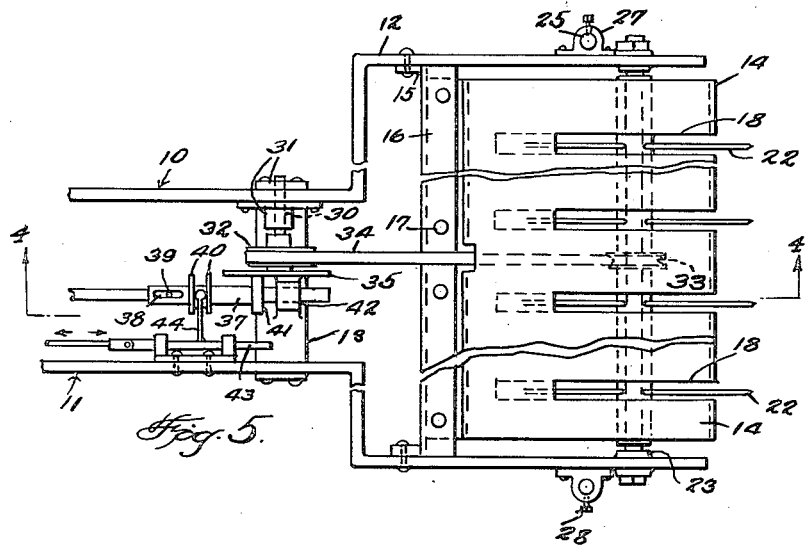
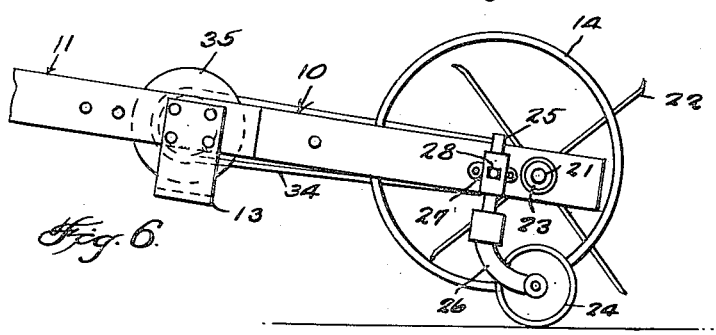
THOMAS E. SCHRAMLING INVENTOR

# United States Patent Office 2,771,732
Patented Nov. 27, 1956

2,771,732

HAY TEDDER

Thomas Edwin Schramling, Columbus, Pa.

Application January 15, 1954, Serial No. 404,323

1 Claim. (Cl. 56—372)

This invention relates to a hay tedder and more particularly to a tedder towed by a tractor or the like, means being provided for separating stones or the like objects which may become wedged between the teeth of the tedder during operation.

It is another object of this invention to provide a hay tedder of this kind having a housing with a power driven rotor in the housing and teeth in the rotor for extension outwardly of the housing to pick up the hay, the teeth being movable into the housing to clear the hay from the housing and rotor.

It is still another object of this invention to provide a hay tedder of this kind having a wheel supported housing for connection to a tractor or the like to be moved about by the tractor, and having a rotor in the housing to be actuated by power from the tractor, there being a manually actuated clutch for determining and controlling the actuation of the rotor.

It is a further object of this invention to provide a hay tedder of this kind which can be readily constructed at an economical cost and easily operated.

Other and further objects and advantages of the invention will be hereinafter described and the novel features thereof defined in the appended claim.

In the drawings:

Fig. 4 is an enlarged fragmentary transverse section, partly broken away and partly in section, taken on the line 4—4 of Fig. 5.

Fig. 5 is an enlarged top plan view, partly broken away of the tedder.

Fig. 6 is an enlarged side elevation of the hay tedder.

Figure 1:
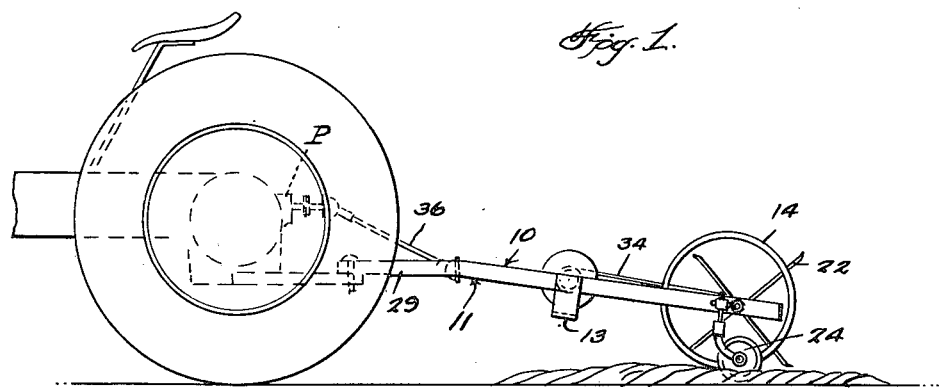
Fig. 1 is a side elevation of a hay tedder, constructed according to an embodiment of this invention, connected to the rear end of a tractor.
Figure 2:
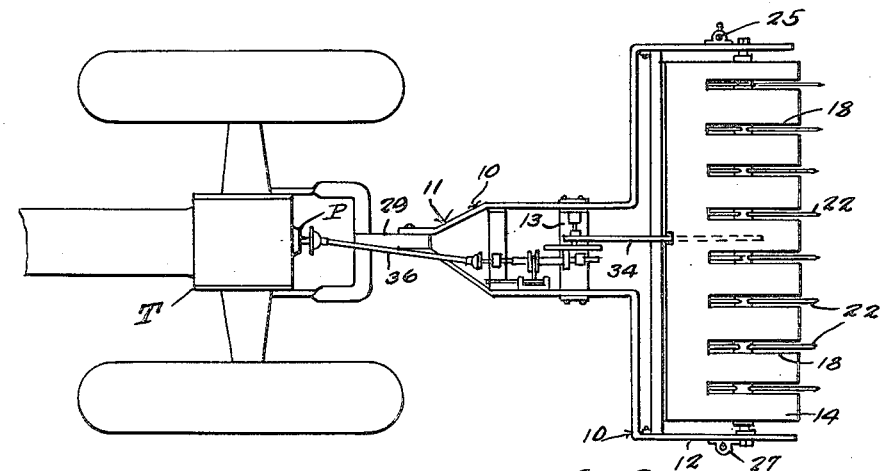
Fig. 2 is a top plan view of the hay tedder, connected to the tractor.
Figure 3:
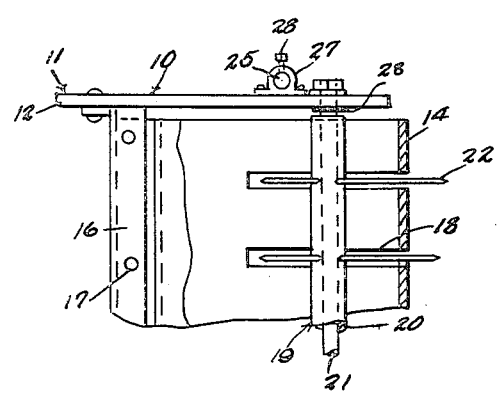
Fig. 3 is an enlarged fragmentary transverse section, partly broken away and partly in section, taken on the line 3—3 of Fig. 4.

Referring more specifically to the drawings the numeral 10 designates generally a hay tedder constructed according to an embodiment of my invention to be towed about an area of a farm or the like to ted the cut hay, without gathering up also stones and other heavy articles normally found in a field with the cut hay.

The hay tedder 10 is formed with a frame 11 having a pair of spaced apart, side frame members 12 held apart and braced by the member 13 extending transversely of the frame 11, at the forward end thereof, and between the side frame members 12.

A drum 14 is disposed transversely of the frame 11 and is fixedly connected to the rearmost of the braces 13.

The rearmost brace 13ª is provided, at its opposite ends, with longitudinally extending ears 15 which are secured to each of the side frame members 12 by bolts 13', welding or other suitable fastening means.

The drum 14 is cylindrical in configuration and is provided with a flange 16 at the adjacent longitudinal edges of the adjacent sides of the split body member which makes up the drum 14.

The flanges 16 are secured to the rearmost brace 13ª by a plurality of bolts 17.

The drum 14 is provided with a plurality of circumferentially or peripherally disposed slots 18 along the length thereof disposed in spaced relation and rearwardly of the flanges 16.

A rotor 19 is supported on the frame by being rotatably supported, at its opposite ends, on each of the side frame members 12 and rearwardly of the flange 16 of the drum 14.

The rotor 19 is formed with a transversely extending tube 20 about a transversely extending mounting shaft 21. A plurality of radially extending teeth 22 are carried by the rotor 19, being secured thereto at one end of each of the teeth, while the other, outer, end of each of the teeth is freely engageable through a directly related slot 18 in the drum 14.

Bearings 23 are secured to each of the side frame members 12 and rotatably support the opposite ends of the shaft 21 so that the rotor 19 may be rotated relative to the drum 14.

The axis of the rotor 19 is disposed eccentric to the axis of the drum 14 so that only the outer portion of the teeth 22 will be free in the slot 18 upon rotation of the rotor 19 in the manner to be more particularly described hereinafter.

Caster wheels 24 are secured to the rear end of the frame 11 and a separate caster wheel 24 is carried by the rear end of each of the side frame members 12.

Each of the caster wheels 24 is adjustably supported on the frame 11 by a vertically extending shaft 25 which is secured at its lower end on a yoke 26 within which the wheel 24 is rotatably supported. The upper end of the shaft 25 is slidably engaged through a clamp 27, also carried by the side frame members 12. The shaft 25 is secured in a selected adjusted position within the clamp 27 by a set screw 28 which extends outwardly of the frame 11 and of the hay tedder so that the caster wheels 24 may be initially adjusted in a proper relation relative to the drum 14 and rotor 10 before the hay tedder is set into operation.

A draw bar 29 is carried by the forward end of the side frame members 12 to be connected to the rear portion of a tractor T when it is desired to move the hay tedder about the surface of a hay field.

A stub shaft 30 is rotatably supported on the frame 11 and on one of the transverse braces 13, one end of the stub shaft 30 being rotatably supported in a bearing 31 carried by one of the side frame members 12 and by a similar bearing 31 engaging the stub shaft 30 intermediate the length thereof.

A pulley 32 is fixedly carried by the stub shaft 30 adjacent to the bearing 31 on the brace 13.

A similar pulley 33 is carried by the rotor 19 being rotatable therewith. A belt 34 is trained about the pulleys 33 and 32 so that upon rotation of the pulley 32, the pulley 33 and rotor 19 will be caused to rotate.

A drive shaft 36 is connected to the power take off P of the tractor T and extends rearwardly from the tractor to be connected to the rotor 19 on the frame 11 whereby the rotor 19, together with the teeth 22, is rotated by the power take off of the tractor.

A sleeve 37 encompasses the drive shaft 36 adjacent one end thereof on the frame 11 as clearly shown in Fig. 5 of the drawings.

The sleeve 37 on the drive shaft 36 is provided with a longitudinally extending slot 38 therein through which the pin 39, carried by the drive shaft, 36 is free to extend so that the sleeve 37 may be moved axially along the length of the drive shaft.

A pair of longitudinally spaced apart discs 40 are formed on the sleeve 37 extending radially outward therefrom so that the sleeve 37 may be moved manually by an attachment on the frame 11.

A friction sleeve 41 is positioned on the sleeve 37 adjacent a bearing 42 for the drive shaft 36 and a longitudinally extending rod 43 is carried by one of the side frame members 12 for manual movement longitudinally thereof. An outwardly extending lug 44 is carried by the rod 43, intermediate the length thereof, and a ball end on the lug is disposed between the discs 40 so that manual movement of the rod 43 in its suitable bearing will also effect the axial movement of the sleeve 37.

The axial movement of the rod 43 will result in the movement of the sleeve 37 and the friction sleeve 41 which is in bearing engagement with a side of a friction disc 35 carried by one end of the stub shaft 30 so that the speed of rotation of the rotor 19 may be manually controlled by the positioning of the sleeve 37 in its relation to the friction disc 35. Movement of the friction sleeve 41 to the left in Fig. 5 will result in a slow movement of the rotor whereas the movement of the friction disc 41 to the left will result in an increase in speed of the rotor relative to the drive shaft 36.

In the use and operation of the hay tedder 10, the teeth extending from the drum will engage and ted or separate the hay lying on the ground to the exclusion of large objects from the drum, as the teeth are withdrawn into the drum through the slots.

While the specific details of one embodiment of this invention have been herein shown and described, the invention is not confined thereto as changes and alterations may be made without departing from the spirit and scope thereof as defined in the appended claim.

I claim:

A hay tedder of the kind described comprising a frame including a pair of transversely spaced apart longitudinally extending side frame members, a plurality of transverse brace members secured at their opposite ends to said side frame members, a hollow drum secured to one end of one of said brace members transversely of said frame, a rotor in said drum having the axis thereof eccentric to the axis of said drum, a bearing on each of said side frame members engaging an end of said rotor for the rotation thereof, said drum being formed with segmental peripheral slots therethrough, radially extending teeth secured at one end to said rotor, the other end of each of said teeth being extensible through a directly related one of said slots for rotation of said rotor, means connecting one end of said frame to a tractor, having a power take off, for drawing said frame over an area of ground, a drive shaft connected at one end to the power takeoff, a bearing on another one of said brace members rotatably supporting the other end of said drive shaft, a sleeve slidable on said drive shaft adjacent said other end thereof, said sleeve having a longitudinally extending slot therethrough, intermediate the ends thereof, and an outwardly extending pin on said drive shaft engaging in said last mentioned slot, manually actuated means for sliding said sleeve on axially of said shaft whereby the hay lying on the ground is to be tedded upon movement of said drum over an area of earth.

References Cited in the file of this patent

UNITED STATES PATENTS

| | | |
|---|---|---|
| 2,502,599 | Smart | Apr. 4, 1950 |
| 2,529,422 | Sampson | Nov. 7, 1950 |
| 2,636,335 | Whitney | Apr. 28, 1953 |